(12) United States Patent
Liu et al.

(10) Patent No.: US 11,931,672 B2
(45) Date of Patent: Mar. 19, 2024

(54) COMPACT L-SHAPED CYLINDER-CONE COMBINED TUBULAR THREE-STAGE AXIAL FLOW DEGASSING DEVICE

(71) Applicant: QINGDAO UNIVERSITY OF TECHNOLOGY, Qingdao (CN)

(72) Inventors: Xinfu Liu, Qingdao (CN); Huifeng Wang, Tianjin (CN); Zhongxian Hao, Beijing (CN); Chunhua Liu, Qingdao (CN); Ji Chen, Xi'an (CN); Feng Liu, Qingdao (CN); Xiaoming Wu, Panjin (CN); Peng Gao, Tianjin (CN); Xiaolei Wang, Qingdao (CN)

(73) Assignee: QINGDAO UNIVERSITY OF TECHNOLOGY, Qingdao (CN)

( * ) Notice: Subject to any disclaimer, the term of this patent is extended or adjusted under 35 U.S.C. 154(b) by 410 days.

(21) Appl. No.: 17/206,157

(22) Filed: Mar. 19, 2021

(65) Prior Publication Data
US 2022/0134257 A1 May 5, 2022

(30) Foreign Application Priority Data
Nov. 2, 2020 (CN) .......................... 202011201163.8

(51) Int. Cl.
*B01D 19/00* (2006.01)
(52) U.S. Cl.
CPC ..... *B01D 19/0068* (2013.01); *B01D 19/0057* (2013.01)
(58) Field of Classification Search
CPC . B01D 19/00; B01D 19/0068; B01D 19/0057
See application file for complete search history.

(56) References Cited

U.S. PATENT DOCUMENTS

| 2,670,056 A | * | 2/1954 | Rossiter | B04C 7/00 55/346 |
|---|---|---|---|---|
| 3,641,745 A | * | 2/1972 | Moore | B04C 3/06 55/345 |
| 7,401,599 B2 | * | 7/2008 | Saito | B04C 5/185 123/518 |
| 2006/0162561 A1 | * | 7/2006 | Oglesby | B01D 21/34 95/253 |
| 2009/0120854 A1 | * | 5/2009 | Parikh | F01M 13/022 210/141 |

* cited by examiner

Primary Examiner — Youngsul Jeong

(57) ABSTRACT

The three-stage axial flow degassing device adopts an efficient degassing technology including a vertical high speed swirling field, a horizontal rapid axial flow field and a vertical reversing scrubbing field formed by a combination of vertical tubes; the first-stage degasser performs the first-stage segmental vertical high speed swirling degassing operation, removes the gas phase carried by the gas-containing fluid, and forms a primary gas and a primary fluid; the microporous uniform mixer breaks bubbles of the primary fluid and forms a gas-liquid uniform mixed flow; the second-stage degasser performs the second-stage horizontal vane wheel swirling generating rapid axial flow degassing operation, removes the gas phase carried by the gas-liquid uniform mixed flow, and forms a secondary gas and a secondary fluid; the third-stage degasser performs the third-stage vertical reversing deep degassing operation, removes liquid phase carried by the secondary gas, and forms a tertiary gas and a tertiary fluid.

10 Claims, 11 Drawing Sheets

COMPACT L-SHAPED CYLINDER-CONE COMBINED TUBULAR THREE-STAGE AXIAL FLOW DEGASSING DEVICE

TECHNICAL FIELD

The present invention relates to an efficient gas-liquid separating device in the field of oil-gas field development and exploitation engineering, and particularly relates to a compact three-stage axial flow degassing device, which is L-shaped, tubular and with a combination of cylinders and cones, and the operation procedure thereof.

BACKGROUND ART

Efficient degassing technology of gas-liquid two-phase flow is of practical significance to the oil-gas field development and exploitation, wherein one of the main reason is that the efficient degassing technology can effectively avoid the slug flow generated during mixed transportation of gas-liquid two phases and avoid the impacts of slug flow on pipelines and equipment along the pipelines, and the other main reason is that efficient degassing technology can effectively lower the backpressure from the bottom hole during oil-gas field exploitation, thereby enhancing the oil-gas recovery rate.

Conventional gas-liquid two-phase separating devices basically include the following three types. The first type is the vertical or horizontal tank-like gas-liquid separators mainly relying on gravity settling; however, the tank-like gas-liquid separators are large in size, poor in compactness and low in separation efficiency, and thus will correspondingly increase production and maintenance costs of oil-gas field exploitation, particularly for the oil-gas separation system at sea. The second type is the swirling gas-liquid separators, the separation of which depends on the centrifugal force, wherein the studies and application of the Gas-Liquid Cylindrical Cyclone (GLCC) is the most mature; the working principle of GLCC is to perform gas-liquid separation mainly by the conversion of flow patterns at the entrance and by the swirling inside of the cylinder, and is mainly applicable to the gas-liquid two-phase flow with low flow rate and low gas-liquid ratio when the gas phase is a continuous phase; however, when it is applied to the mist flow with high gas-liquid ratio, high gas velocity and slug flow, the liquid phase will climb up along the wall of the separator in the form of droplets rotating at a high speed or in the form of a liquid membrane, and will finally rotate out of the chimney and result in bad separation performances. The third type is the axial flow guide vane swirling gas-liquid separator developed by FMC Corporation of America, which is an international petroleum equipment tycoon; when the gas-liquid two-phase flow enters into the separator in an axial direction and generates a strong swirling, the liquid phase will be thrown towards the wall surface under the action of centrifugal force and form a flowing liquid membrane, which is to be collected into a collecting tube after flowing through an annular space at the end of the separation segment and finally flow into the pipeline for liquid phase; the gas phase will spirally advance in the central region of the pipeline, and the swirling is converted into an axial flow when flowing through the swirling eliminating member, and finally flow into the pipeline for gas phase through the diffuser. It should be noted that the current studies on the compact efficient gas-liquid separation technology are still in an experimental stage in China.

On the basis of existing feasible technology, and with the basic principle of being compact, efficient and widely applicable, a tubular three-stage axial flow degassing device for efficient separation of gas-liquid two-phase flow in the field of oil-gas field development and exploitation engineering is developed so as to reduce the size of the separation apparatus, enhance the separation efficiency, as well as extend the range of application.

SUMMARY OF THE INVENTION

To overcome the defects and deficiencies existing in current tank-like gas-liquid separation apparatuses and cylindrical swirling gas-liquid separation apparatuses in oil-gas field development and exploitation engineering, and to enhance the studies of compact and efficient degassing separation technology, which are still in an experimental stage in China, the present invention provides a compact L-shaped cylinder-cone combined tubular three-stage axial flow degassing device suitable for efficient separation of gas-containing fluid in the field of oil-gas field development and exploitation. The three-stage axial flow degassing device adopts an efficient degassing technology including a vertical high speed swirling field, a horizontal rapid axial flow field and a vertical reversing scrubbing field formed by a combination of vertical tubes, horizontal tubes and T-shaped tubes, performs in sequence a first-stage segmental vertical high speed swirling degassing operation, a second-stage horizontal vane wheel swirling generating rapid axial flow degassing operation, and a third-stage vertical reversing deep degassing operation, and thus has the characteristics of efficient gas-liquid separation, low liquid containing ratio for air after degassing and low air containing ratio for liquid after degassing, thereby obtaining efficient separation of gas-containing fluid.

The technical solution adopted by the present invention for solving its technical problem is to develop a compact L-shaped cylinder-cone combined tubular three-stage axial flow degassing device, mainly comprising a cylindrical tube swirling generator, a first-stage degasser, a microporous uniform mixer, a second-stage degasser and a third-stage degasser, wherein the main parts of the cylindrical tube swirling generator, the first-stage degasser, the second-stage degasser and the third-stage degasser adopt a super two-way stainless steel material lined with epoxy resin, the cylindrical tube swirling generator and the microporous uniform mixer are respectively connected to an upper part and a lower part of the first-stage degasser by means of flanges, the microporous uniform mixer and the third-stage degasser are connected as one piece according to the second-stage degasser, the cylindrical tube swirling generator and the first-stage degasser are coaxially and vertically placed, the microporous uniform mixer and the second-stage degasser are coaxially and horizontally placed, and the cylindrical tube swirling generator and the first-stage degasser maintain to be parallel to the third-stage degasser, and perpendicularly intersect with the microporous uniform mixer and the second-stage degasser at the same time.

The cylindrical tube swirling generator adjusts an obliquely incident gas-containing fluid according to a reduced spiral tooth slot and a spiral liquid inlet tube, forms a vertical high speed gas-containing swirling, and meanwhile ensures that the vertical high speed gas-containing swirling flows out obliquely, the cylindrical tube swirling generator comprising the spiral liquid inlet tube, a swirling generating tube, a first-stage exhaust tube and a tube connecting sleeve.

The swirling generating tube adopts a thick-walled cylindrical tube having a closed top end, wherein two ends of the swirling generating tube are respectively provided with double flanges and a single flange, and a central part of a topmost flange is drilled with a socket hole. An inner wall of the swirling generating tube is milled with reduced swirling generating teeth, wherein a tooth trace of the reduced swirling generating teeth is a spiral line, which is placed right-handed and has an increasing pitch of the spiral line from top to bottom, a section of the reduced swirling generating teeth takes a shape of an isosceles triangle, the reduced spiral tooth slot is formed between adjacent reduced swirling generating teeth, serves as a flow channel of the gas-containing fluid and forms the vertical high speed swirling field, inside of which the gas-containing fluid continuously rotates and speeds up and is adjusted to be a vertical high speed gas-containing swirling, and a diameter of a cylindrical surface, on which a slot bottom of the reduced spiral tooth slot is located, is equal to an inner diameter of an upper cylindrical degassing tube segment of the first-stage degasser. A tube wall of the swirling generating tube located at an upper entrance of the reduced spiral tooth slot is drilled with a swirling generating liquid inlet hole, wherein the swirling generating liquid inlet hole is obliquely placed, and an angle between its central line and the horizontal plane is equal to a lead angle of the spiral line on which the upper tooth trace of the reduced swirling generating teeth is located.

The spiral liquid inlet tube is used to transport gas-containing fluids, wherein one end of the spiral liquid inlet tube is provided with a flange and the other end is provided with a wedge-shaped groove, the wedge-shaped groove of the spiral liquid inlet tube being fixed to the swirling generating liquid inlet hole of the swirling generating tube by means of circumferential welding, and a part where the wedge-shaped groove of the spiral liquid inlet tube intersects with an inner wall of the swirling generating tube maintaining tangent with the slot bottom surface of the reduced spiral tooth slot, thereby ensuring that the gas-containing fluid can successfully plunge into the reduced spiral tooth slot.

The first-stage exhaust tube adopts a long and thin bent tube, and exhausts a primary gas after the first-stage degassing, wherein one end of the first-stage exhaust tube and a first-stage gas collecting tube are coaxially arranged, and the other end thereof is connected to a gas transportation manifold by means of a flange.

The tube connecting sleeve adopts a thick-walled tube, wherein an inner wall of the tube connecting sleeve is lathed with sealing tube thread, and connects the first-stage exhaust tube and the first-stage gas collecting tube to be one piece by means of threaded connection, an outer ring surface of the tube connecting sleeve and the socket hole in the topmost flange of the swirling generating tube are fixed by means of circumferential welding, and the tube connecting sleeve and the swirling generating tube are coaxially arranged.

The first-stage degasser performs the first-stage segmental vertical high speed swirling degassing operation according to the cylinder-cone degassing tube, removes most of the gas phase carried by the gas-containing fluid and forms a primary gas and a primary fluid, and adjusts, by means of a swirling stopping rectifier, the primary fluid rotating at a high speed to a vertical uniform flow so as to avoid siphoning, wherein the first-stage degasser connects the cylindrical tube swirling generator and the microporous uniform mixer to be one piece by means of flange connection, and comprises a cylinder-cone degassing tube, the swirling stopping rectifier, the first-stage gas collecting tube and a first-stage liquid discharge tube.

The cylinder-cone degassing tube adopts a combination of a cylindrical tube and a conical tube, both ends of which are connected, wherein two ends of the cylinder-cone degassing tube are provided with flanges, and the cylinder-cone degassing tube connects the first-stage liquid discharge tube and the swirling generating tube to be one piece by means of flange connection. The cylinder-cone degassing tube is composed of an upper cylindrical degassing tube segment, a conical degassing tube segment and a lower cylindrical degassing tube segment, wherein inner walls of the lower cylindrical degassing tube segment and the upper cylindrical degassing tube segment adopt a cylindrical surface, while an inner wall of the conical degassing tube segment adopts an inverted conical surface, and axial lengths of the three tube segments increase in sequence, a diameter of the circular surface at a large end of the inverted conical surface on which the inner wall of the conical degassing tube segment located is equal to an inner diameter of the upper cylindrical degassing tube segment, and a diameter of the circular surface at a small end thereof is equal to an inner diameter of the lower cylindrical degassing tube segment.

The swirling stopping rectifier adopts a sheet structure in a shape similar to "币", which is a Chinese character, and is formed by welding a swirling stopping cone, a rectifying rod and rectifying vanes, wherein the swirling stopping cone adopts a conical shell, the top end of which is closed, and is located at a lower part in a tube cavity of the lower cylindrical degassing tube segment, an inner surface and an outer surface of the shell of the swirling stopping cone adopt conical surfaces of the same conicity, the rectifying rod adopts a round rod and is provided with a cone at a bottom end so as to avoid swirling of the primary fluid. The rectifying vanes adopt a plate structure and are located in the tube cavity of the upper liquid inlet tube segment, wherein each rectifying vane is provided with a guide groove along a radially inner side of the rectifying rod, all rectifying vanes are evenly arranged along an outer ring surface of the rectifying rod, a top end surface and a bottom end surface of each rectifying vane, as well as a top end surface of its guide groove all form a conical surface along the circumferential direction, and a conicity of the conical surface on which the shell of the swirling stopping cone is located is equal to that of the conical surface on which the top end surface, the bottom end surface, as well as the top end surface of the guide groove of each rectifying vane is located, and is larger than that of a conical surface on which a shell of a gas collecting hood is located. The rectifying vanes are all located on the same cylindrical surface along a radially outer side surface of the rectifying rod, and the cylindrical surface on which the outer side surface of each rectifying vane and an inner wall of the upper liquid inlet tube segment are in interference fit, as a result of which the rectifying vanes realize axial fixation of the swirling stopping rectifier in the upper tube cavity of the first-stage liquid discharge tube according to interference fit.

The first-stage gas collecting tube is formed by welding a gas collecting cylindrical tube segment and a gas collecting hood, and is used to converge and transport the primary gas, wherein the gas collecting hood adopts a conical shell with a hole on the top and is located in the tube cavity of the upper cylindrical degassing tube segment, an inner surface and an outer surface of the shell of the gas collecting hood adopt conical surfaces of the same conicity, the gas collecting cylindrical tube segment adopts a long and thin straight tube, and the top thereof is lathed with sealing tube thread, and a tube diameter and a wall thickness of the gas collecting cylindrical tube segment are both equal to those of the first-stage exhaust tube.

The first-stage liquid discharge tube adopts a T-shaped thick-walled tube with a closed bottom end, is provided with a flange at each end of its T-shaped tube segment, and is located at the very bottom of the first-stage degasser, wherein the first-stage liquid discharge tube comprises an upper liquid inlet tube segment, a lower settling tube segment and a right liquid discharge straight tube segment, and converges and discharges the primary fluid, a tube diameter of the upper liquid inlet tube segment and a tube diameter of the lower settling tube segment are both equal to that of the lower cylindrical degassing tube segment and are greater than that of the right liquid discharge straight tube segment, the lower settling tube segment is used to settle sand grains and other solid particles in the primary fluid, and the right liquid discharge straight tube segment is placed horizontally and is connected to a uniform mixing tube to be one piece by means of flange connection.

The procedure of the first-stage segmental vertical high speed swirling degassing operation is as follows: the vertical high speed gas-containing swirling rotates at a high speed along the tube wall of the upper cylindrical degassing tube segment, and, after the vertical high speed gas-containing swirling flows into the conical degassing tube segment, the tube wall conicity increases and the cross section of a passageway rapidly retracts, so an angular momentum increases, a friction coefficient between the vertical high speed gas-containing swirling and the tube wall decreases and the rotation speed constantly increases; since the axial length of the lower cylindrical degassing tube segment is the smallest, the vertical high speed gas-containing swirling stays for a relatively short time while the liquid phase fluid is gradually thrown towards the tube wall of the cylinder-cone degassing tube and rotates and flows downwards to form the primary fluid, which is adjusted to a vertical uniform flow by the swirling stopping rectifier and is discharged from the right liquid discharge straight tube segment of the first-stage liquid discharge tube; meanwhile, the gas-phase fluid reversely rises at the central part of the cylinder-cone degassing tube and is converged to the primary gas, which is captured by the gas collecting hood and transported by the gas collecting cylindrical tube segment of the first-stage gas collecting tube.

The microporous uniform mixer breaks large bubbles of the primary fluid according to squirrel-cage reduced micropores of the micropore tube, and thus forms a gas-liquid uniform mixed flow containing small bubbles, thereby avoiding occurrence of the slug flow in the primary fluid in an operating condition having a high gas-liquid ratio, and reducing the impact of the slug flow on the second-stage axial flow degassing, the microporous uniform mixer comprising a micropore tube, a uniform mixing tube, a left limit disc, a right limit disc and a mixed flow buffer tube.

The micropore tube adopts a ceramic circular tube, and is provided with reduced micropores on the tube wall thereof, wherein the reduced micropores take a squirrel-cage type and are layered at equal intervals along an axial direction of the micropore tube, all the reduced micropore layers are in a staggered arrangement, reduced micropores on each layer are evenly distributed along the peripheral direction, each reduced micropore is formed by a combination of a large conical micropore, a cylindrical micropore and a small conical micropore from within along the radial direction of the micropore tube, axial lengths of the large conical micropore, the cylindrical micropore and the small conical micropore of the reduced micropore decrease in sequence, and a conicity of a conical surface on which a pore wall of the large conical micropore is located is smaller than that of a conical surface on which a pore wall of the small conical micropore is located, as a result, the primary fluid carrying large bubbles is compressed by a pore channel of the large conical micropore, and is cut by a pore channel of the cylindrical micropore so as to form a gas-liquid uniform mixed flow containing small bubbles, then the gas-liquid uniform mixed flow containing small bubbles flows through a pore channel of the small conical micropore, and is slowed down and shot into an uniform mixing ring cavity between the micropore tube and the uniform mixing tube. Two side ends of the micropore tube are provided with a left micropore ring clip and a right micropore ring clip, wherein the left micropore ring clip of the micropore tube and a left limit slot of the left limit disc, as well as the right micropore ring clip thereof and a right limit slot of the right limit disc are in precise fit, thereby realizing two-way limit and axial fixation of the micropore tube.

The uniform mixing tube adopts a left-end reduced thin-walled cylindrical tube and is provided with a micropore tube inside, the mixed flow buffer tube adopts a thick-walled cylindrical short tube, both ends of which are connected, and realizes buffering of the gas-liquid uniform mixed flow, wherein the uniform mixing tube and the mixed flow buffer tube both are provided with flanges at two ends thereof, and are connected to the first-stage liquid discharge tube and the axial flow degassing tube as one piece by means of flange connection. An inner wall of the uniform mixing tube is formed by a combination of a left uniform mixing cylindrical surface, an uniform mixing conical surface and a right uniform mixing cylindrical surface, wherein an uniform mixing ring cavity is formed between the uniform mixing conical surface and the right uniform mixing cylindrical surface of the uniform mixing tube and the outer ring surface of the micropore tube, and the left uniform mixing cylindrical surface of the uniform mixing tube and the outer ring surface of the micropore tube are in clearance fit.

Both the left limit disc and the right limit disc adopt a round flange structure, wherein a central part of the left limit disc is drilled with a round hole and a hole wall of the round hole in the left limit disc is milled with a left limit slot, and a central part of the right limit disc is milled with a right limit slot, the left limit slot and the right limit slot both have a section of right-angled trapezoid, each of the uniform mixed flow slotted holes is uniformly arranged along a peripheral direction of a slot edge of the right limit slot, and can realize the communication between the uniform mixing tube and the mixed flow buffer tube; an outer side slot wall of the uniform mixed flow slotted hole along the radial direction of the right limit disc adopts a semicircular conical surface while the inner side slot wall thereof adopts an arching surface, and slot walls on both sides of the uniform mixed flow slotted hole along the circumferential direction of the right limit disc adopt a semicircular cylindrical surface, as a result, the hole wall of the uniform mixed flow slotted hole takes a streamline shape and decreases hydraulic loss of the gas-liquid uniform mixed flow.

The second-stage degasser performs the second-stage horizontal vane wheel swirling generating rapid axial flow degassing operation according to the axial flow vane wheel, removes most of the gas phase carried by the gas-liquid uniform mixed flow, and forms a secondary gas and a secondary fluid, and adjusts the axially rotating secondary fluid to a horizontal uniform axial flow by means of a vane rectifier, wherein the second-stage degasser connects the microporous uniform mixer and the third-stage degasser to be one piece by means of flange connection, and comprises an axial flow degassing tube, an axial flow vane wheel, a vane rectifier, a second-stage gas collecting tube and a second-stage liquid discharge tube.

The axial flow degassing tube adopts a two-end connected thick-walled cylindrical long tube, wherein the axial flow degassing tube is provided with flanges at both ends and is connected to the second-stage liquid discharge tube to be one piece by means of flange connection, the tube diameters of the axial flow degassing tube, the mixed flow buffer tube and the left liquid inlet tube segment being the same.

The axial flow vane wheel is formed of an axial flow rod and swirling generating vanes formed thereon, and is located at a leftmost end of the axial flow degassing tube, wherein two side ends of the axial flow rod respectively adopt a semi-ellipse spherical surface and a conical surface. An inner side surface of each swirling generating vane is fixed to an outer ring surface of the axial flow rod by means of circumferential welding, while outer side surfaces of all swirling generating vanes are located on the same cylindrical surface which is in interference fit with an inner wall of the axial flow degassing tube, as a result, the swirling generating vanes realize axial fixation of the axial flow vane wheel inside of the axial flow degassing tube cavity according to the interference fit. A contour line of the swirling generating vane is a spiral line extending along the outer ring surface of the axial flow rod and having a gradually decreasing pitch from left to right, a tangent line at the leftmost end point of the contour line of each swirling generating vane remains parallel to an axis of the axial flow rod, and the swirling generating vanes, in cooperation with the semi-ellipse spherical surface of the axial flow rod, can successively guide the gas-liquid uniform mixed flow to each swirling generating vane; a tangent line at the rightmost end point of the contour line of each swirling generating vane intersects with the axis of the axial flow rod at an acute angle, and the swirling generating vanes, in cooperation with the conical surface of the axial flow rod, can smoothly guide out a plurality of horizontal rapid gas-containing axial flows. A section area of the swirling generating vane gradually increases along the contour line thereof, and spiral axial flow vane grooves are formed between adjacent swirling generating vanes, serve as flow channels of the gas-liquid uniform mixed flow and form a horizontal rapid axial flow field, inside of which the gas-liquid uniform mixed flow constantly speeds up, and is reversed and adjusted into a plurality of horizontal rapid gas-containing axial flows.

The vane rectifier is formed of axial flow vanes which are evenly welded along an outer ring surface of the second-stage gas collecting tube, wherein each axial flow vane adopts a trapezoid plate structure and is located at the rightmost end of the axial flow degassing tube cavity, all axial flow vanes are located on the same cylindrical surface along a radially outer side surface of the second-stage gas collecting tube, and the cylindrical surface on which the outer side surface of each axial flow vane is located and an inner wall of the axial flow degassing tube are in interference fit, as a result, the axial flow vanes realize the axial fixation of the vane rectifier and the second-stage gas collecting tube in the axial flow degassing tube cavity according to the interference fit.

The second-stage gas collecting tube is formed by a combination of a gas colleting thin conical tube, a gas collecting thick conical tube and a gas collecting bent tube, converges and discharges the secondary gas, wherein the gas collecting bent tube adopts a long and thin bent tube, and an end of a vertical segment thereof is lathed with sealing tube thread, and a horizontal segment thereof and the axial flow degassing tube are coaxially arranged, and the vertical segment thereof and a liquid collecting tube are coaxially arranged; the gas collecting thin conical tube adopts a tube shell, an inner tube wall and an outer tube wall of which are both conical surfaces, and controls a liquid-containing content of gas inside of the second-stage gas collecting tube; the gas collecting thick conical tube adopts a tube shell having an inner tube wall with a cylindrical surface and an outer tube wall with a conical surface, and can successively guide the secondary fluid into the vane rectifier; a diameter of the large circle surface of the conical surface on which an inner tube wall of the gas collecting thin conical tube is located, a diameter of the cylindrical surface on which an inner cylindrical surface tube wall of the gas collecting thick conical tube is located and an inner diameter of the gas collecting bent tube are all the same.

The second-stage liquid discharge tube adopts a right-end reduced T-shaped thick-walled tube, is provided with flanges at all ends of its T-shaped tube segment, and is located at the rightmost side of the second-stage degasser, wherein the second-stage liquid discharge tube is composed of a left liquid inlet tube segment, a right reduced liquid discharge tube segment and an upper liquid discharge straight tube segment, and converges and discharges the secondary fluid, an inner tube wall and an outer tube wall of the right reduced liquid discharge tube segment both adopt a conical surface and are connected to a liquid transportation manifold, and the upper liquid discharge straight tube segment is vertically placed and is provided with a disc connecting sleeve inside of a tube cavity thereof.

The procedure of the second-stage horizontal vane wheel swirling generating rapid axial flow degassing operation is as follows: a plurality of horizontal rapid gas-containing axial flows plunge leftwards and obliquely into the axial flow degassing tube, rapidly rotate inside of the axial flow degassing tube and constantly advance along the axial direction, while the liquid phase fluid is gradually thrown towards the tube wall, and axially rotates and flows rightwards to form a hollowed secondary fluid; meanwhile, the gas-phase fluid gradually migrates to a central part of the flow degassing tube and forms a coaxial stratified flow together with the secondary fluid, and then axially rotates and flows rightwards to form a long and thin secondary gas in a shape of conical core; the secondary fluid is guided into the vane rectifier through an outer tube wall of the second-stage gas collecting tube, is adjusted to be a horizontal uniform axial flow and is discharged by the second-stage liquid discharge tube, and the secondary gas is captured by the gas collecting thin conical tube and is discharged by the gas collecting bent tube.

The third-stage degasser performs the third-stage vertical reversing deep degassing operation according to the wet gas reversing tube, removes a small amount of remaining liquid phase carried by the secondary gas, forms a tertiary gas and a tertiary fluid, and realizes the flow pressure balance of the tertiary gas and the buffering and pressure stabilization of the tertiary fluid by means of a liquid collecting tube, wherein the third-stage degasser comprises a wet gas reversing tube, the liquid collecting tube, a third-stage exhaust tube, a third-stage liquid discharge tube and a disc connecting sleeve.

The wet gas reversing tube adopts a three-way T-shaped thin-walled tube having identical diameter, and is formed by welding a wet gas transportation tube segment and a reversing tube segment, wherein the wet gas transportation tube segment is vertically placed, and is in coaxial and layered arrangement with the liquid collecting tube from the inside out, so as to form a double-tube buffer ring cavity, thereby realizing buffering and pressure stabilization of the tertiary fluid; the reversing tube segment vertically intersects with the liquid collecting tube, wherein both sides of an inner wall of the reversing tube segment are milled with reversing conical cavity, the secondary gas transported by the wet gas transportation tube segment is reversed and slowed down by the reversing conical cavity of the reversing tube segment, and then is shot into the double-tube buffer ring cavity and forms a vertical reversing scrubbing field, thereby realizing deep degassing. An inner diameter of the wet gas transportation tube segment, a diameter of the small end circular surface of the conical surface on which the reversing conical cavity of the reversing tube segment is located, and an inner diameter of the gas collecting bent tube are all the same; meanwhile, a sum of a flow pressure of the tertiary gas in the third-stage exhaust tube and a liquid column differential pressure of the liquid collecting tube maintains dynamic equilibrium with a pressure of the tertiary fluid inside of the third-stage liquid discharge tube.

The liquid collecting tube adopts a two-end communication thin-walled cylindrical tube, wherein flanges are provided at both ends of the liquid collecting tube, the liquid collecting tube and a disc connecting sleeve are connected to the third-stage exhaust tube and the second-stage liquid discharge tube as one piece by means of flange connection and socket flanges, and a lower part of a tube wall of the liquid collecting tube is drilled with a round hole and is welded together with the third-stage liquid discharge tube. The third-stage liquid discharge tube adopts a long and thin straight tube and discharges the tertiary fluid, and the end thereof is connected to the liquid transportation manifold by means of a flange.

The third-stage exhaust tube adopts two-end flanged reduced short tube and discharges the tertiary gas, wherein an inner wall of the third-stage exhaust tube adopts a conical surface, and a diameter of the large end circular surface of the conical surface on which the inner wall is located is equal to an inner diameter of the liquid collecting tube.

The disc connecting sleeve adopts a disc tube, and is provided with a socket flange and a connecting sleeve in sequence from top to bottom, wherein the socket flange realizes axial positioning of the disc connecting sleeve, an outer ring surface of the connecting sleeve and the tube wall of the liquid discharge straight tube segment on the second-stage liquid discharge tube are in clearance fit, and an upper part of the inner wall of the connecting sleeve and a lower part of an outer ring surface of the wet gas transportation tube segment are in interference fit, as a result, the connecting sleeve realizes connection of the disc connecting sleeve and the wet gas reversing tube according to interference fit; meanwhile, a lower part of an inner wall of the connecting sleeve is lathed with sealing thread, and connects the disc connecting sleeve and the second-stage gas collecting tube to be one piece by means of thread connection.

The present invention can achieve the following technical effects: the three-stage axial flow degassing device adopts the efficient degassing technology including a vertical high speed swirling field, a horizontal rapid axial flow field and a vertical reversing scrubbing field formed by a combination of vertical tubes, horizontal tubes and T-shaped tubes, and has the characteristics of efficient gas-liquid separation, low liquid containing ratio for air after degassing and low air containing ratio for liquid after degassing; the cylindrical tube swirling generator adjusts an obliquely incident gas-containing fluid according to a spiral liquid inlet tube and a reduced spiral tooth slot, and forms a vertical high speed gas-containing swirling, and the first-stage degasser performs the first-stage segmental vertical high speed swirling degassing operation according to the cylinder-cone degassing tube, removes most of the gas phase carried by the gas-containing fluid and forms a primary gas and a primary fluid, and adjusts the primary fluid rotating at a high speed to a vertical uniform flow by means of a swirling stopping rectifier; the microporous uniform mixer breaks large bubbles of the primary fluid according to squirrel-cage reduced micropores of the micropore tube, and thus forms a gas-liquid uniform mixed flow containing small bubbles, the second-stage degasser performs the second-stage horizontal vane wheel swirling generating rapid axial flow degassing operation according to the axial flow vane wheel, removes most of the gas phase carried by the gas-liquid uniform mixed flow and forms a secondary gas and a secondary fluid, and adjusts the axially rotating secondary fluid to a horizontal uniform axial flow by means of a vane rectifier, and the third-stage degasser performs the third-stage vertical reversing deep degassing operation according to the wet gas reversing tube, removes the small amount of remaining liquid phase carried by the second-phase gas, forms a tertiary gas and a tertiary fluid, and realizes the flow pressure balance, buffering and pressure stabilization by means of the liquid collecting tube.

DESCRIPTION OF DRAWINGS

With reference to the drawings below, the present invention will be further explained, but is not limited to the embodiments below.

Figure 1:
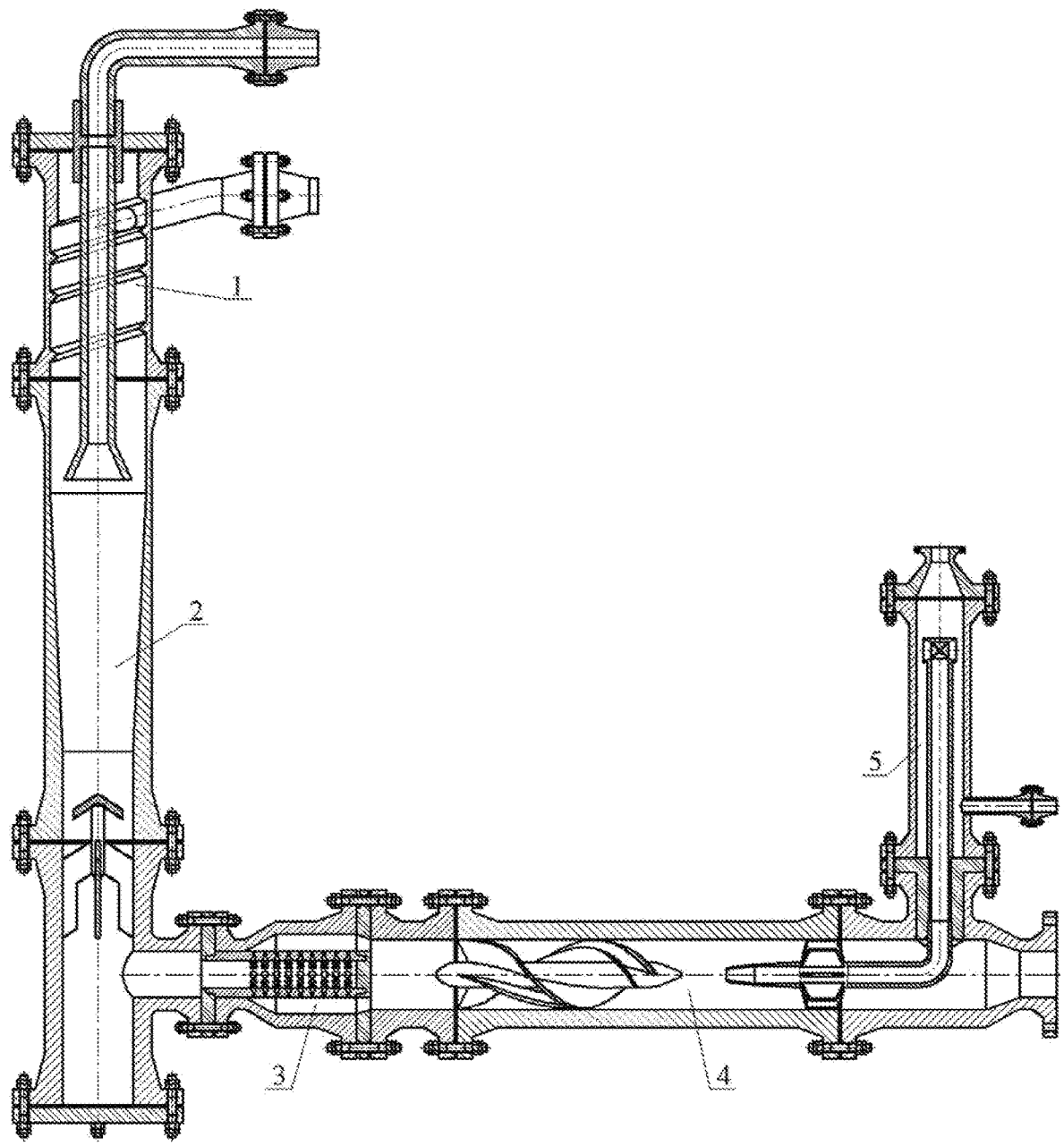
FIG. 1 is a typical structure diagram according to the compact L-shaped cylinder-cone combined tubular three-stage axial flow degassing device provided in the present invention.

In the drawings, 1—Cylindrical tube swirling generator, 2—First-stage degasser, 3—Microporous uniform mixer, 4—Second-stage degasser, 5—Third-stage degasser, 6—First-stage exhaust tube, 7—Tube connecting sleeve, 8—Spiral liquid inlet tube, 9—Swirling generating tube, 10—Reduced swirling generating teeth, 11—Reduced spiral tooth slot, 12—Wedge-shaped groove, 13—Swirling generating liquid inlet hole, 14—Socket hole, 15—First-stage gas collecting tube, 16—Cylinder-cone degassing tube, 17—Swirling stopping rectifier, 18—First-stage liquid discharge tube, 19—Lower settling tube segment, 20—Right liquid discharge straight tube segment, 21—Upper liquid inlet tube segment, 22—Lower cylindrical degassing tube segment, 23—Conical degassing tube segment, 24—Upper cylindrical degassing tube segment, 25—Gas collecting hood, 26—Gas collecting cylindrical tube segment, 27—Swirling stopping cone, 28—Rectifying rod, 29—Rectifying vanes, 30—Guide groove, 31—Left limit disc, 32—Uniform mixing tube, 33—Micropore tube, 34—Right limit disc, 35—Mixed flow buffer tube, 36—Uniform mixing ring cavity, 37—Right uniform mixing cylindrical surface, 38—Uniform mixing conical surface, 39—Left uniform mixing cylindrical surface, 40—Left limit slot, 41—Uniform mixed flow slotted hole, 42—Right limit slot, 43—Right micropore ring clip, 44—Reduced micropores, 45—Left micropore ring clip, 46—Large conical micropore, 47—Cylindrical micropore, 48—Small conical micropore, 49—Axial flow vane wheel, 50—Axial flow degassing tube, 51—Second-stage gas collecting tube, 52—Vane rectifier, 53—Second-stage liquid discharge tube, 54—Right reduced liquid discharge tube segment, 55—Upper liquid discharge straight tube segment, 56—Left liquid inlet tube segment, 57—Swirling generating vanes, 58—Axial flow rod, 59—Spiral axial flow vane slots, 60—Gas collecting bent tube, 61—Axial flow vanes, 62—Gas collecting thick conical tube, 63—Gas collecting thin conical tube, 64—Third-stage exhaust tube, 65—Liquid collecting tube, 66—Wet gas reversing tube, 67—Third-stage liquid discharge tube, 68—Disc connecting sleeve, 69—Connecting sleeve, 70—Socket flange, 71—Double-tube buffer ring cavity, 72—Wet gas transportation tube segment, 73—Reversing tube segment, 74—Reversing conical cavity.

EMBODIMENTS

In FIG. 1, the compact L-shaped cylinder-cone combined tubular three-stage axial flow degassing device mainly comprises a cylindrical tube swirling generator 1, a first-stage degasser 2, a microporous uniform mixer 3, a second-stage degasser 4 and a third-stage degasser 5, and adopts the efficient degassing technology including a vertical high speed swirling field, a horizontal rapid axial flow field and a vertical reversing scrubbing field formed by a combination of vertical tubes, horizontal tubes and T-shaped tubes, wherein: the first-stage exhaust tube of the cylindrical tube swirling generator 1 and the third-stage exhaust tube of the third-stage degasser 5 are connected to the gas transportation manifold by means of flanges, and respectively pressurize and output separated primary gas and tertiary gas; and the second-stage liquid discharge tube of the second-stage degasser 4 and the third-stage liquid discharge tube of the third-stage degasser 5 are connected to the liquid transportation manifold by means of flanges, and respectively pressurize and output separated secondary fluid and tertiary fluid.

In FIG. 1, the cylindrical tube swirling generator 1 and the microporous uniform mixer 3 are respectively connected to an upper part and a lower part of the first-stage degasser 2 by means of flanges, the microporous uniform mixer 3 and the third-stage degasser 5 are connected to be one piece according to the second-stage degasser 4, the cylindrical tube swirling generator 1 and the first-stage degasser 2 are placed vertically and coaxially, the microporous uniform mixer 3 and the second-stage degasser 4 are placed horizontally and coaxially, and the cylindrical tube swirling generator 1 and the first-stage degasser 2 are parallel to the third-stage degasser 5, and perpendicularly intersect with the microporous uniform mixer 3 and the second-stage degasser 4 at the same time.

In FIG. 1, during debugging of the three-stage axial flow degassing device, hydraulic test and air tightness test need to be perform first, wherein the test pressure needs to reach 1.25 times of the design pressure; then it is checked whether the pipeline system joints are unimpeded and whether there is leak, and the instrument air is switched on to check whether the instrument air is clean and dry. During maintenance, it is checked whether there are foreigner matter accumulation and corrosion inside of the first-stage liquid discharge tube of the first-stage degasser 2, the axial flow degassing tube and the second-stage liquid discharge tube of the second-stage degasser 4, and the liquid collecting tube of the third-stage degasser 5; it is checked whether there is corrosion on the surfaces of the swirling stopping rectifier of the first-stage degasser 2, as well as the axial flow vane wheel and the vane rectifier of the second-stage degasser 4, wherein replacement is needed if a thickness of the corrosion is greater than 2 mm; and the dirt of the reduced swirling generating teeth of the cylindrical tube swirling generator 1, the micropore tube of the microporous uniform mixer 3, and the reversing conical cavity of the third-stage degasser 5 is checked, and rinsing is needed when a thickness of the dirt is greater than 3 mm.

Figure 2:
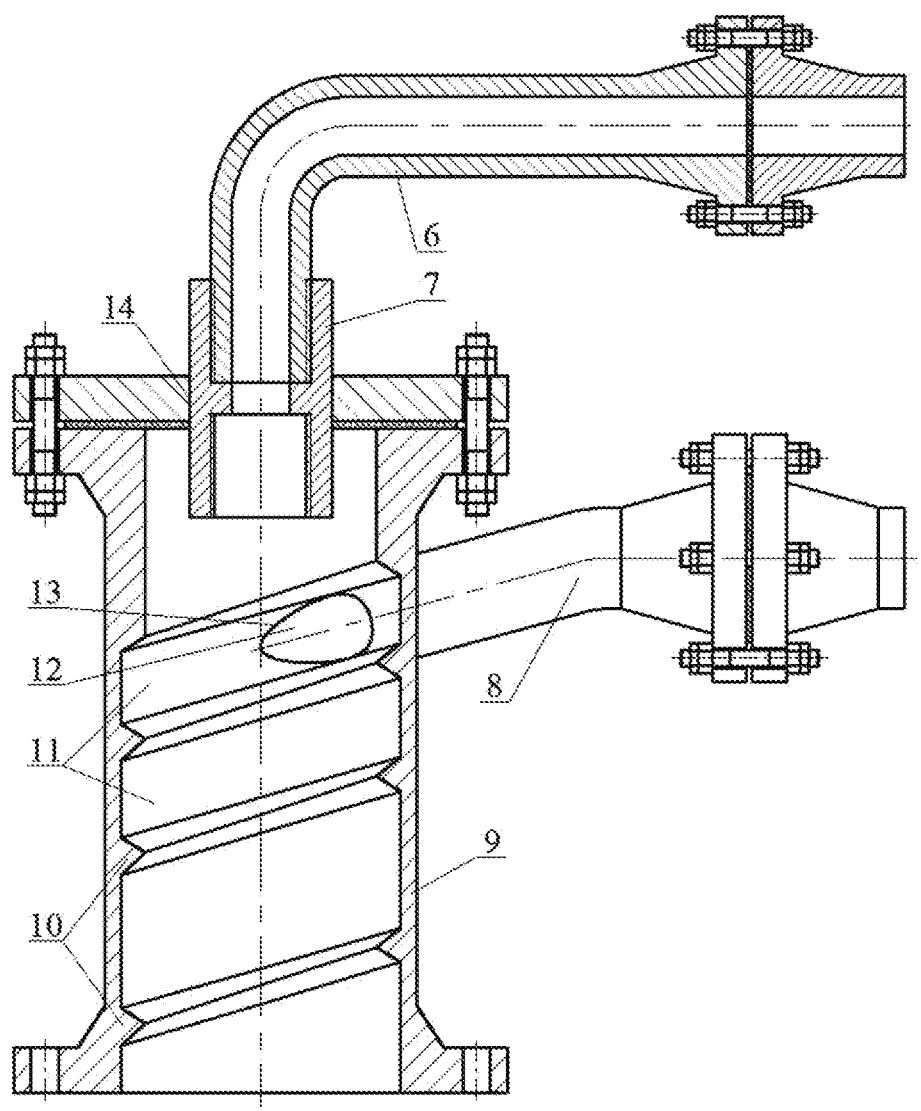
FIG. 2 is a structure diagram of the cylindrical tube swirling generator in the compact L-shaped cylinder-cone combined tubular three-stage axial flow degassing device.

In FIG. 2, the cylindrical tube swirling generator 1 adjusts an obliquely incident gas-containing fluid according to a reduced spiral tooth slot 11 and a spiral liquid inlet tube 8, and forms a vertical high speed gas-containing swirling, a pitch of the spiral line of the tooth trace of the reduced swirling generating teeth 10 is adjusted according to the viscosity, flow pressure, density and other physical property parameters of the gas-containing fluid, the diameter selection of the first-stage exhaust tube 6 needs to consider the flux, flow pressure and other factors of the primary gas, the specification design of the swirling generating tube 9 needs to consider the flux, flow pressure and other factors of the gas-containing fluid, and the angle between the axis of the spiral liquid inlet tube 8 and the horizontal level is consistent with the lead angle of the spiral line of the upper tooth trace of the reduced swirling generating teeth 10.

In FIG. 2, the tube connecting sleeve 7 and the first-stage exhaust tube 6 are connected by means of thread, and the tube connecting sleeve 7 and the socket hole 14 are fixed by means of circumferential welding, the vertical high speed swirling field is formed inside of the reduced spiral tooth slot 11 between adjacent reduced swirling generating teeth 10, and the spiral liquid inlet tube 8 is fixed to the swirling generating tube 9 by means of circumferential welding between the wedge-shaped groove 12 and the swirling generating liquid inlet hole 13.

Figure 3:
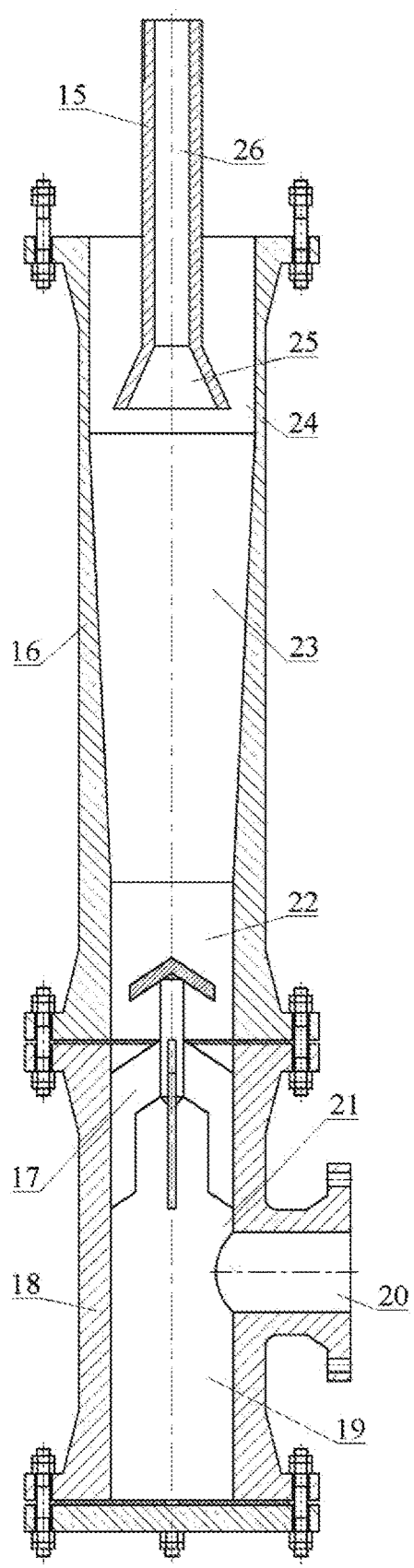
FIG. 3 is a structure diagram of the first-stage degasser in the compact L-shaped cylinder-cone combined tubular three-stage axial flow degassing device.
Figure 4:
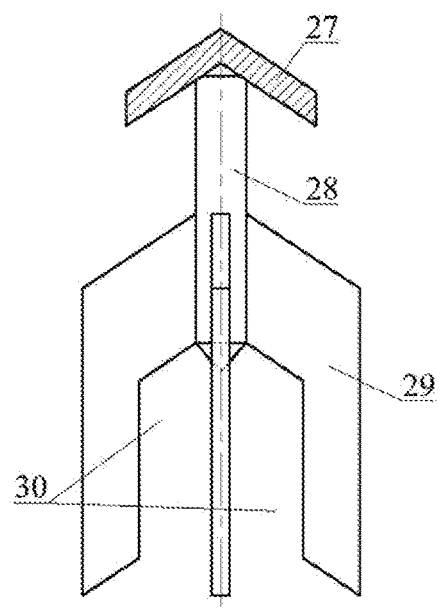
FIG. 4 is a structure diagram of the swirling stopping rectifier in the first-stage degasser.

In FIGS. 3 and 4, the first-stage degasser 2 removes most of the gas phase carried by the gas-containing fluid and forms a primary gas and a primary fluid, the flow rate of the vertical high speed gas-containing swirling after entering into the cylinder-cone degassing tube 16 is adjusted according to the tube wall conicity of the conical degassing tube segment 23, the axial lengths of the upper cylindrical degassing tube segment 24 and the lower cylindrical degassing tube segment 22, and other parameters, the flux and the liquid containing ratio of the primary gas are realized by the adjustment of the tube diameter of the first-stage gas collecting tube 15, the flux and the gas containing ratio of the primary fluid are realized by the adjustment of the axial length of the lower settling tube segment 19 and the tube diameter of the right liquid discharge straight tube segment 20, and the conicity design of the conical surface on which the shell of the swirling stopping cone 27 is located needs to consider the flux, flow pressure, viscosity and other physical property parameters of the primary fluid.

In FIGS. 3 and 4, the first-stage degasser 2 connects the cylindrical tube swirling generator 1 and the microporous uniform mixer 3 to be one piece by means of flanges, the first-stage gas collecting tube 15 and the tube connecting sleeve 7 are connected by means of thread, the gas collecting hood 25 and the gas collecting cylindrical tube segment 26 are welded to be one piece, the cylinder-cone degassing tube 16 connects the first-stage liquid discharge tube 18 and the swirling generating tube 9 to be one piece by means of flange connection, the rectifying vanes 29 realizes axial fixation of the swirling stopping rectifier 17 according to interference fit, the lower settling tube segment 19, the right liquid discharge straight tube segment 20 and the upper liquid inlet tube segment 21 converge and discharge the primary fluid, the axial lengths of the lower cylindrical degassing tube segment 22, the upper cylindrical degassing tube segment 24 and the conical degassing tube segment 23 increase in sequence, the swirling stopping cone 27 is welded onto the top end of the rectifying rod 28 and the rectifying vanes 29 are welded along the outer ring surface of the rectifying rod 28, the guide groove 30 successfully guide the vertical uniform flow into the tube cavity of the first-stage liquid discharge tube 18.

Figure 5:
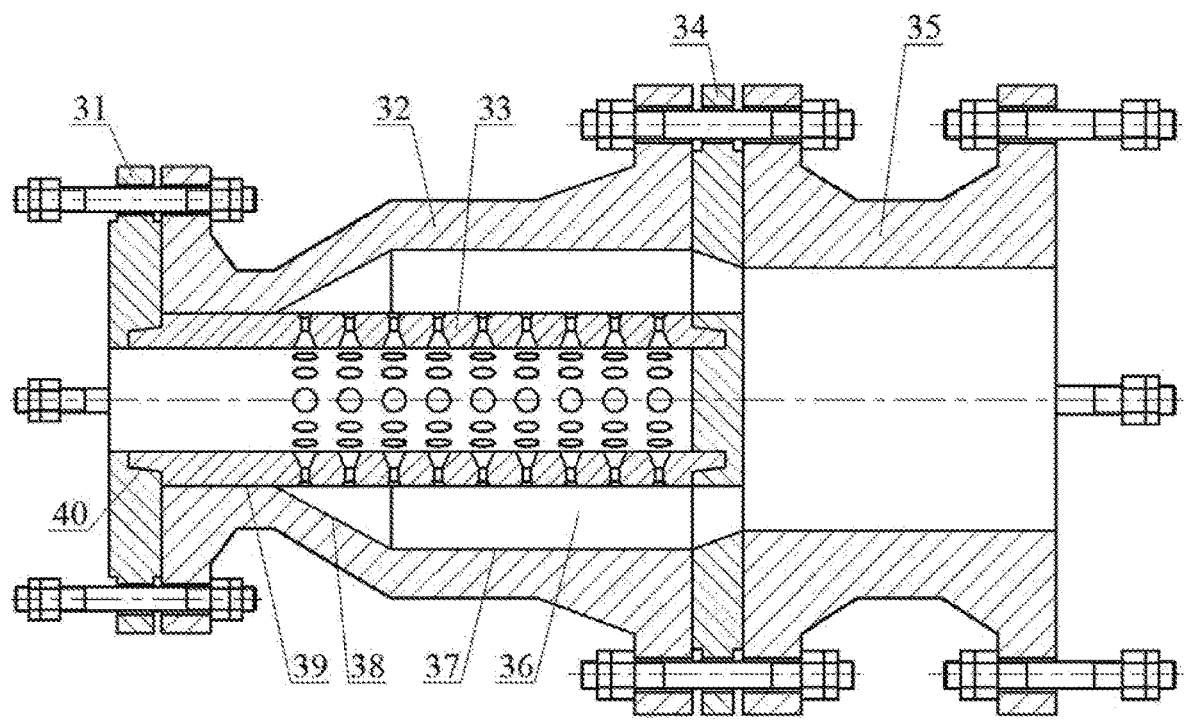
FIG. 5 is a structure diagram of the microporous uniform mixer in the compact L-shaped cylinder-cone combined tubular three-stage axial flow degassing device.
Figure 6:
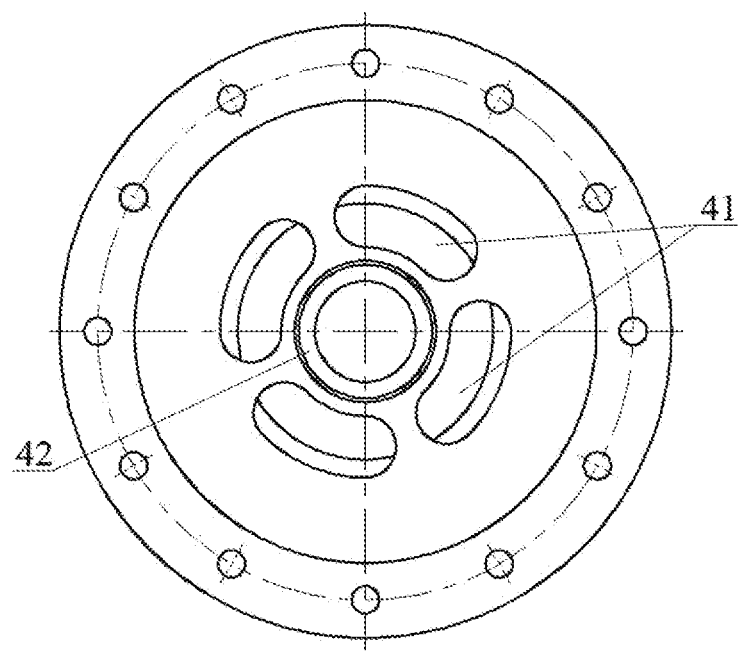
FIG. 6 is a structure diagram of the right limit disc in the microporous uniform mixer.
Figure 7:
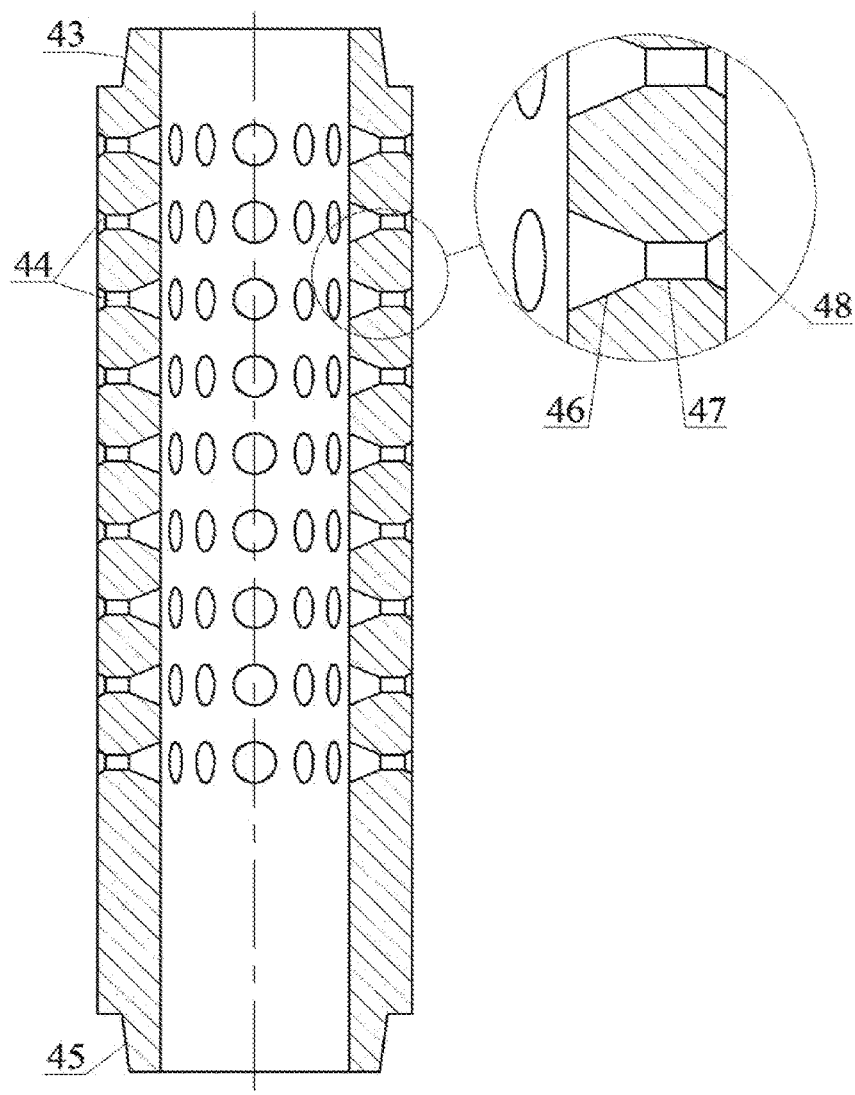
FIG. 7 is a structure diagram of the micropore tube in the microporous uniform mixer.

In FIGS. 5 to 7, the microporous uniform mixer 3 adjust the primary fluid to a gas-liquid uniform mixed flow according to the micropore tube 33, the number of layers and the number of micropores for each layer of the reduced micropores 44 on the reduced micropore tube 33 are adjusted according to the flow pressure, flow rate, viscosity and other physical property parameters of the primary fluid, the number and size of the uniform mixed flow slotted holes 41, as well as the volume of the mixed uniform ring cavity 36 are all designed according to the flux of the gas-liquid uniform mixed flow, and the design of the volume of the mixed flow buffer tube 35 needs to consider the flow rate, the flow pressure and other factors of the gas-liquid uniform mixed flow.

In FIGS. 5 to 7, the uniform mixing tube 32 and the mixed flow buffer tube 35 are connected to the first-stage liquid discharge tube 18 and the axial flow degassing tube to be one piece by means of flange connection, the left micropore ring clip 45 is in precise fit with the left limit slot 40 of the left limit disc 31, and the right micropore ring clip 43 is in precise fit with the right limit slot 42 of the right limit disc 34, so as to realize the two-way limit and axial fixation of the micropore tube 33, the right uniform mixing cylindrical surface 37 and the uniform mixing conical surface 38 form the uniform mixing ring cavity 36 together with the outer ring surface of the micropore tube 33, the left uniform mixing cylindrical surface 39 and the outer ring surface of the micropore tube 33 are in clearance fit, each of the uniform mixed flow slotted holes 41 realizes the communication of the uniform mixing tube 32 and the mixed flow buffer tube 35, and each of the reduced micropores 44 is formed by a combination of a large conical micropore 46, a cylindrical micropore 47 and a small conical micropore 48.

Figure 8:
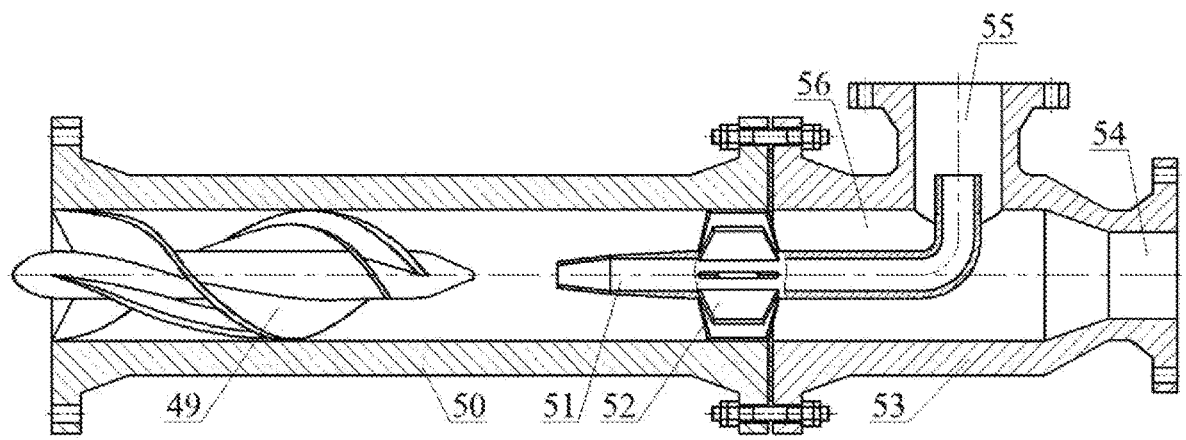
FIG. 8 is a structure diagram of the second-stage degasser in the compact L-shaped cylinder-cone combined tubular three-stage axial flow degassing device.
Figure 9:
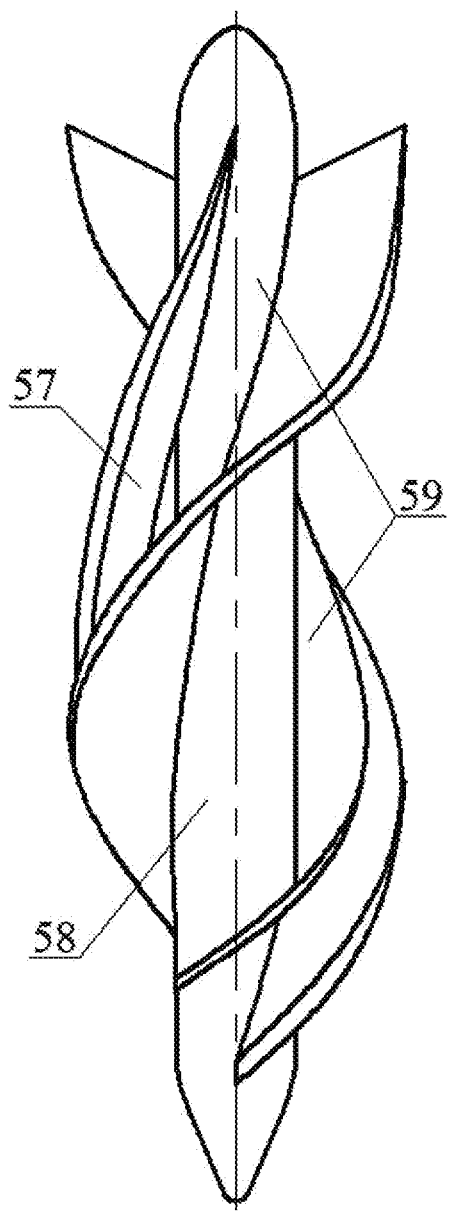
FIG. 9 is a structure diagram of the axial flow vane wheel in the second-stage degasser.
Figure 10:
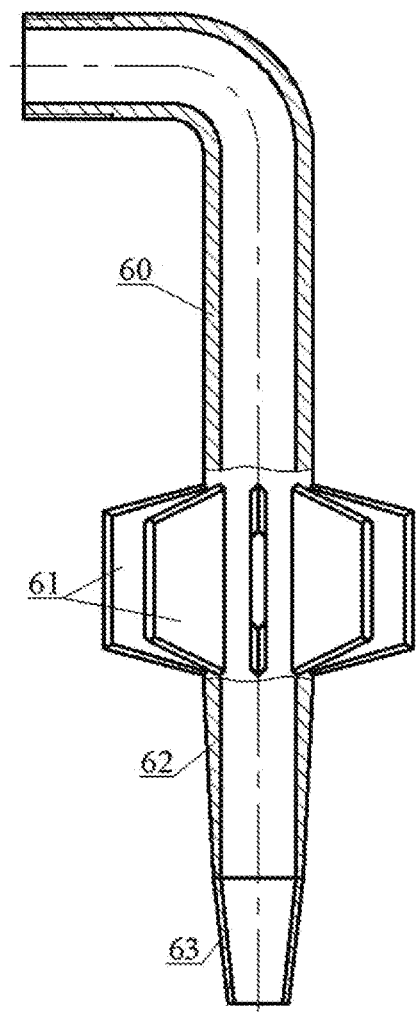
FIG. 10 is a structure diagram of the second-stage gas collecting tube and the vane rectifier in the second-stage degasser.

In FIGS. 8 to 10, the second-stage degasser 4 removes most of the gas phase carried by the gas-liquid uniform mixed flow, and forms a secondary gas and a secondary fluid, the tube diameter of the axial flow degassing tube 50 is consistent with the tube diameter of the mixed flow buffer tube 35, the number of the swirling generating vanes 57 and the pitch of the spiral line of the contour line thereof are both adjusted according to the viscosity, flow pressure, density and other physical property parameters of the gas-liquid uniform mixed flow, the number of the axial flow vanes 61 is designed according to the flow rate, flow pressure, viscosity and other factors of the secondary fluid, the flux of the secondary gas and the liquid containing ratio thereof are realized by the adjustment of the tube diameter of the second-stage gas collecting tube 51, and the flux of the secondary fluid and the air containing ratio thereof are realized by adjusting the axial length of the left liquid inlet tube segment 56 and the tube diameter of the right reduced liquid discharge tube segment 54.

In FIGS. 8 to 10, the second-stage degasser 4 connects the microporous uniform mixer 3 and the third-stage degasser 5 to be one piece by means of flange connection, the inner side surface of each swirling generating vane 57 is fixed to the outer ring surface of the axial flow rod 58 by means of circumferential welding, and the outer side surface of each swirling generating vane 57 realizes axial fixation of the axial flow vane wheel 49 in the left side tube cavity of the axial flow degassing tube 50 according to interference fit, the horizontal rapid axial flow field is formed inside of the spiral axial flow vane groove 59; the inner side surface of each axial flow vane 61 is uniformly welded to the outer ring surface of the second-stage gas collecting tube 51, and the outer side surface of each axial flow vane 61 realizes the axial fixation of the vane rectifier 52 and the second-stage gas collecting tube 51 in the right side tube cavity of the axial flow degassing tube 50 according to interference fit, the gas collecting bent tube 60, the gas collecting thick conical tube 62 and the gas collecting thin conical tube 63 are used for collecting and discharging the secondary gas, and the right reduced liquid discharge tube segment 54, the upper liquid discharge straight tube segment 55 and the left liquid inlet tube segment 56 of the second-stage liquid discharge tube 53 are used to converge and discharge the secondary fluid.

Figure 11:
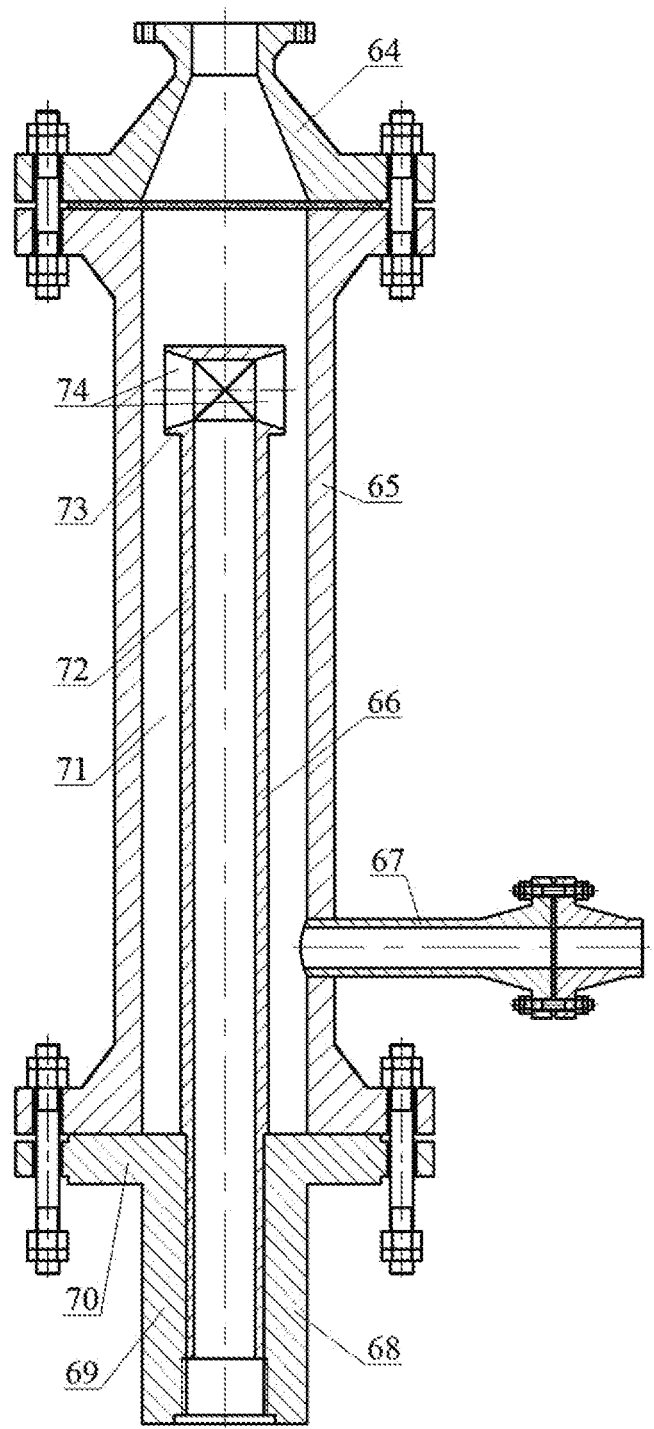
FIG. 11 is a structure diagram of the third-stage degasser in the compact L-shaped cylinder-cone combined tubular three-stage axial flow degassing device.

In FIG. 11, the third-stage degasser 5 removes the small amount of remaining liquid phase carried by the secondary gas, and forms a tertiary gas and a tertiary fluid, wherein the flux of the tertiary gas and the liquid containing ratio thereof are realized by the adjustment of the volume of the reversing conical cavity 74 and the conicity of the conical surface on which the inner wall of the third-stage exhaust tube 64 is located, the flux of the tertiary fluid and the gas containing ratio thereof are realized by the adjustment of the volume of the double-tube buffer ring cavity 71 and the axial length of the liquid collecting tube 65, and the selection of the tube diameter of the third-stage liquid discharge tube 67 needs to consider the flux, flow pressure and other factors of the tertiary fluid.

In FIG. 11, the liquid collecting tube 65 is connected to the third-stage exhaust tube 64, the disc connecting sleeve 68 and the second-stage liquid discharge tube 53 to be one piece by means of flange connection and the socket flange 70, the third-stage liquid discharge tube 67 is welded to the lower part of the tube wall of the liquid collecting tube 65, the connecting sleeve 69 realizes connection of the disc connecting sleeve 68 and the wet gas reversing tube 66 according to interference fit, and simultaneously connects the disc connecting sleeve 68 and the second-stage gas collecting tube 51 to be one piece by means of thread connection, the wet gas transportation tube segment 72 and the liquid collecting tube 65 are in coaxial and layered arrangement, and form the double-tube buffer ring cavity 71, and the secondary gas is reversed and slowed down after flowing through the reversing conical cavity 74 of the reversing tube segment 73.

Figure 12:
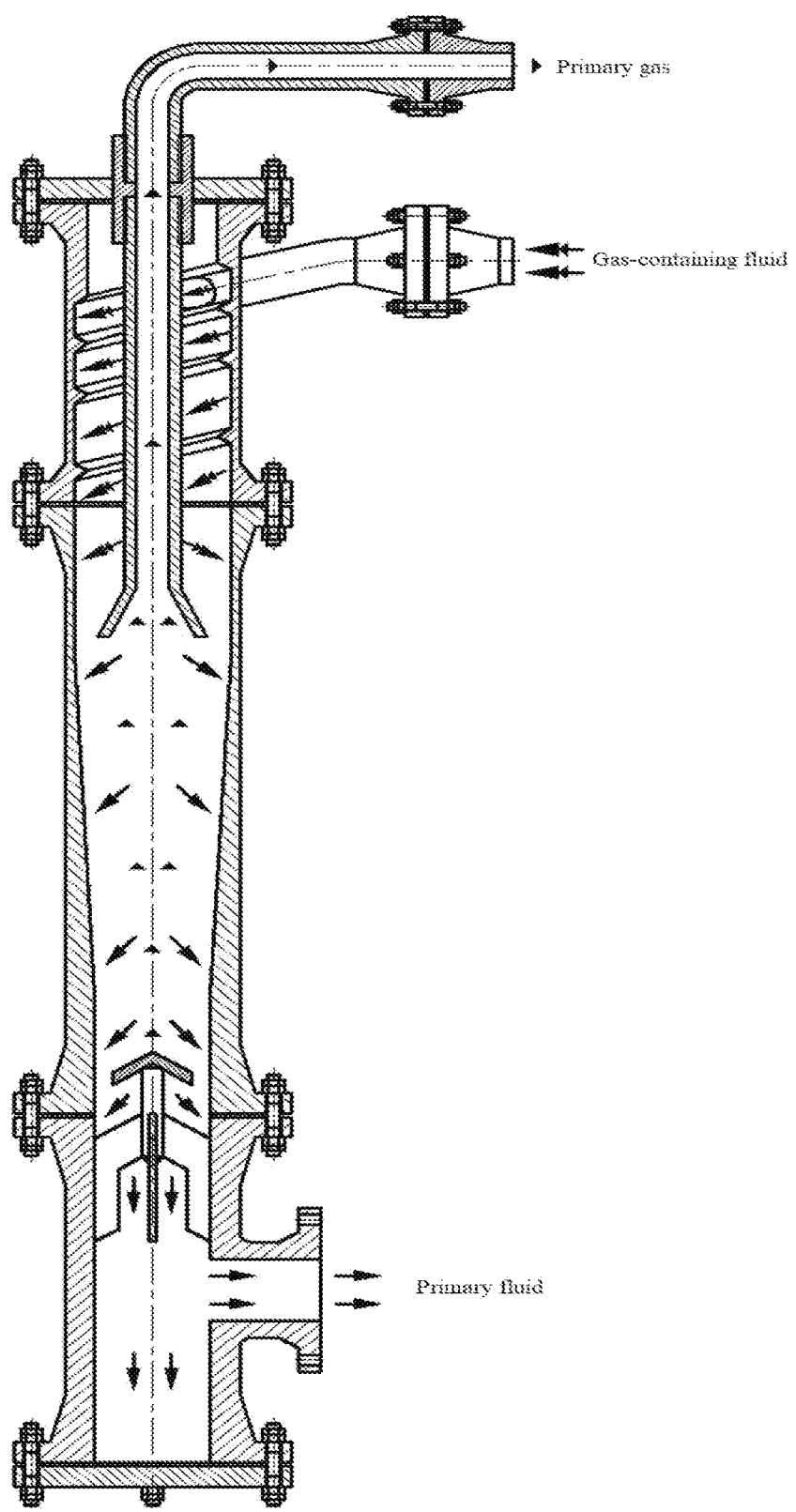
FIG. 12 is a procedure diagram of the first-stage segmental vertical high speed swirling degassing operation by the compact L-shaped cylinder-cone combined tubular three-stage axial flow degassing device.

In FIG. 12, the procedure of the first-stage segmental vertical high speed swirling degassing operation is as follows: the gas-containing fluid obliquely plunges downwards into the reduced spiral tooth slot 11 by the spiral liquid inlet tube 8, and forms a vertical high speed swirling field, the gas-containing fluid constantly rotates and speeds up in the vertical high speed swirling field between adjacent reduced swirling generating teeth 10, and is adjusted to a vertical high speed gas-containing swirling, then the vertical high speed gas-containing swirling rotates along a tube wall of the upper cylindrical degassing tube segment 24, and flows into the conical degassing tube segment 23, then a tube wall conicity increases, a cross section of a passageway rapidly retracts, an angular momentum increases, a friction coefficient between the vertical high speed gas-containing swirling and the tube wall decreases, and a rotation speed constantly increases, the axial length of the lower cylindrical degassing tube segment 22 is the smallest, the vertical high speed gas-containing swirling stays for a relatively short time, while the liquid phase fluid is gradually thrown towards the tube wall of the cylinder-cone degassing tube 16, and rotates and flows downwards to form the primary fluid, and the primary fluid is adjusted sequentially by a swirling stopping cone 27 and the rectifying vanes 29 to a vertical uniform flow, which is guided by a guide groove 30 into the right liquid discharge straight tube segment 20 and is then discharged; meanwhile, the gas-phase fluid reversely rises at the central part of the cylinder-cone degassing tube 16 and converges to the primary gas, which is captured by the gas collecting hood 25, sent into the first-stage exhaust tube 6 sequentially by the gas collecting cylindrical tube segment 26 and the tube connecting sleeve 7, and discharged to the gas transportation manifold.

Figure 13:
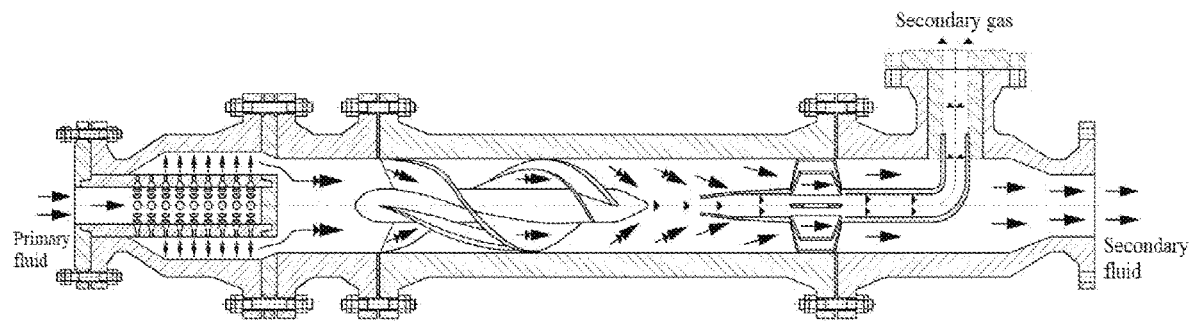
FIG. 13 is a procedure diagram of the second-stage horizontal vane wheel swirling generating rapid axial flow degassing operation by the compact L-shaped cylinder-cone combined tubular three-stage axial flow degassing device.

In FIG. 13, the procedure of the second-stage horizontal vane wheel swirling generating rapid axial flow degassing operation is as follows: the primary fluid carrying large bubbles is compressed by the pore channel of large conical micropores 46 of reduced micropores 44, and is cut by the pore channel of the cylindrical micropores 47 to form the gas-liquid uniform mixed flow containing small bubbles, then the gas-liquid uniform mixed flow flows through the pore channel of the small conical micropores 48 and is slowed down and shot into the uniform mixing ring cavity 36, then the gas-liquid uniform mixed flow flows through each uniform mixed flow slotted hole 41 and enters into the mixed flow buffer tube 35 for buffering; then, the gas-liquid uniform mixed flow plunges into the spiral axial flow vane groove 59 and forms the horizontal rapid axial flow field; the gas-liquid uniform mixed flow constantly rotates and speeds up in the horizontal rapid axial flow field between adjacent swirling generating vanes 57, and is reversed and adjusted to a plurality of horizontal rapid gas-containing axial flows; the plurality of horizontal rapid gas-containing axial flows move leftwards and obliquely plunge into the axial flow degassing tube 50, rapidly rotate inside of the axial flow degassing tube 50 and constantly advance along the axial direction, while the liquid phase fluid is gradually thrown towards the tube wall of the axial flow degassing tube 50, and axially rotates and flows rightwards to form a hollowed secondary fluid; meanwhile, the gas phase fluid gradually migrates to a central part of the flow degassing tube 50 and forms a coaxial stratified flow together with the secondary fluid, and then axially rotates ad flows rightwards to form a long and thin secondary gas in a shape of conical core; the secondary fluid is guided into the axial flow vane 61 sequentially through the outer tube wall of the gas collecting thin conical tube 63 and that of the gas collecting thick conical tube 62, and is adjusted to a horizontal uniform axial flow; then the secondary fluid enters into the left liquid inlet tube segment 56, and is discharged by the right reduced liquid discharge tube segment 54 to the liquid transportation manifold, and the secondary gas is captured by the gas collecting thin conical tube 63, sent by the gas collecting thick conical tube 62 to the gas collecting bent tube 60 and discharged.

Figure 14:
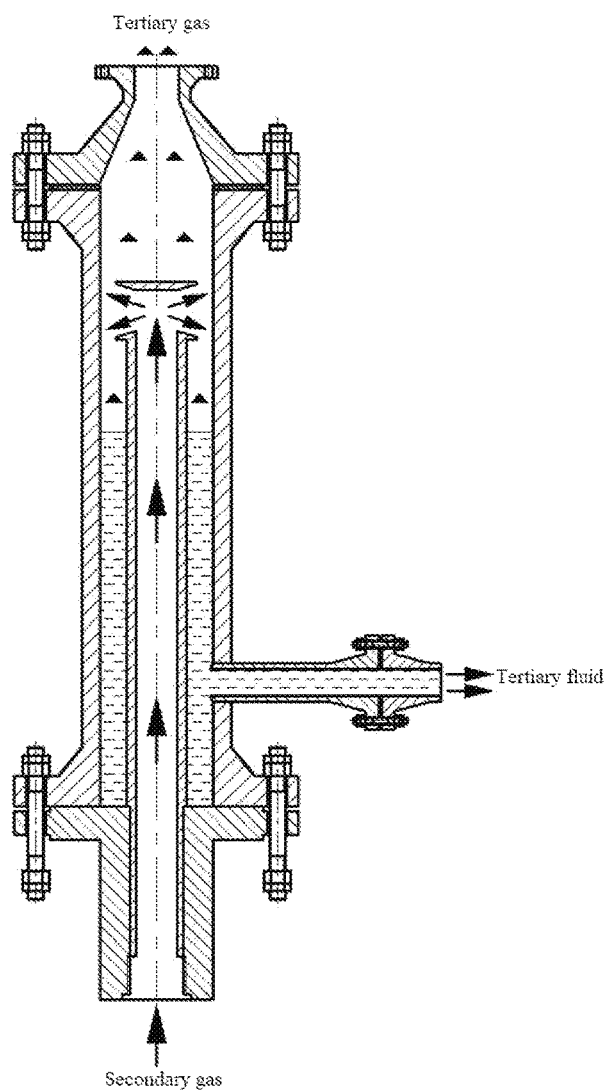
FIG. 14 is a procedure diagram of the third-stage vertical reversing deep degassing operation by the compact L-shaped cylinder-cone combined tubular three-stage axial flow degassing device.

In FIG. 14, the procedure of the third-stage vertical reversing deep degassing operation is as follows: the secondary gas carrying a small amount of liquid phase enters into the reversing tube segment 73 through the wet gas transportation tube segment 72, is reversed and slowed down by the reversing conical cavity 74, and then is shot into the double-tube buffer ring cavity 71 to form the vertical reversing scrubbing field, inside of which the small amount of remaining liquid phase carried by the secondary gas is deeply removed, thereby forming the tertiary gas and the tertiary fluid; meanwhile, a sum of the flow pressure of the tertiary gas of the third-stage exhaust tube 64 and the differential pressure of the liquid cylinder of the liquid collecting tube 65 in the vertical reversing scrubbing field maintains dynamic equilibrium with the pressure of the tertiary fluid in the third-stage liquid discharge tube 67, the tertiary gas is discharged through the third-stage exhaust tube 64 to the gas transportation manifold, while the tertiary fluid is discharged though the third-stage liquid discharge tube 67 to the liquid transportation manifold.

The above embodiments are merely to explain the present invention, and the structure, connection manner and so on for each part are variable. Any equivalent transformation and improvement made on the basis of the technical solution of the present invention should not be excluded from the scope of protection of the present invention.

The invention claimed is:

1. A compact L-shaped cylinder-cone combined tubular three-stage axial flow degassing device, wherein a cylindrical tube swirling generator and a microporous uniform mixer are respectively connected to an upper part and a lower part of a first-stage degasser by means of flanges, a second-stage degasser connects the microporous uniform mixer and a third-stage degasser to be one piece by means of flange connection, and the three-stage axial flow degassing device performs in sequence a first-stage segmental vertical high speed swirling degassing operation, a second-stage horizontal vane wheel swirling generating rapid axial flow degassing operation, and a third-stage vertical reversing deep degassing operation, comprising:

a cylindrical tube swirling generator; wherein: the cylindrical tube swirling generator forms a vertical high speed gas-containing swirling, and comprises a spiral liquid inlet tube, a swirling generating tube, a first-stage exhaust tube and a tube connecting sleeve; the swirling generating tube adopts a thick-walled cylindrical tube having a closed top end, an inner wall of the swirling generating tube is milled with reduced swirling generating teeth, and a reduced spiral tooth slot is formed between adjacent reduced swirling generating teeth, serves as a flow channel of a gas-containing fluid and forms a vertical high speed swirling field; the swirling generating tube forms a swirling generating liquid inlet hole, a wedge-shaped groove of the spiral liquid inlet tube is fixed to the swirling generating liquid inlet hole of the swirling generating tube by means of circumferential welding, the first-stage degasser comprises a first-stage gas collecting tube, a tube connecting sleeve connects the first-stage exhaust tube and the first-stage gas collecting tube to be one piece by means of threaded connection, and an outer ring surface of the tube connecting sleeve and a socket hole in the topmost flange of the swirling generating tube are fixed by means of circumferential welding;

a first-stage degasser; wherein: the first-stage degasser removes most of gas phase carried by the gas-containing fluid and forms a primary gas and a primary fluid, and comprises a cylinder-cone degassing tube, a swirling stopping rectifier, the first-stage gas collecting tube and a first-stage liquid discharge tube; the cylinder-cone degassing tube adopts a combination of a cylindrical tube and a conical tube, both ends of which are connected, and connects the first-stage liquid discharge tube and the swirling generating tube to be one piece by means of flange connection, and the cylinder-cone degassing tube is composed of a lower cylindrical degassing tube segment, a conical degassing tube segment and an upper cylindrical degassing tube segment and axial lengths of the lower cylindrical degassing tube segment, the upper cylindrical degassing tube segment and the conical degassing tube segment increase in sequence; the swirling stopping rectifier adopts a sheet structure, and is formed by welding a swirling stopping cone, a rectifying rod and rectifying vanes, wherein the swirling stopping cone adopts a conical shell, the top end of which is closed, while the gas collecting hood adopts a conical shell with a hole on the top end, each rectifying vane is provided with a guide groove along a radially inner side of the rectifying rod, all rectifying vanes are evenly arranged along an outer ring surface of the rectifying rod, and the rectifying vanes realize axial fixation of the swirling stopping rectifier in the upper tube cavity of the first-stage liquid discharge tube according to interference fit; the first-stage gas collecting tube is formed by welding a gas collecting cylindrical tube segment and a gas collecting hood, the first-stage liquid discharge tube adopts a T-shaped thick-walled tube with a closed bottom end, and comprises an upper liquid inlet tube segment, a lower settling tube segment and a right liquid discharge straight tube segment, and the right liquid discharge straight tube segment is connected to a uniform mixing tube to be one piece by means of flange connection;

a microporous uniform mixer; wherein: the microporous uniform mixer forms a gas-liquid uniform mixed flow containing small bubbles, and comprises a micropore tube, a uniform mixing tube, a left limit disc, a right limit disc and a mixed flow buffer tube; the micropore tube adopts a ceramic circular tube, reduced micropores on the micropore tube take a squirrel-cage and are layered at equal intervals along an axial direction of the micropore tube, each reduced micropore is formed by a combination of a large conical micropore, a cylindrical micropore and a small conical micropore from within along the radial direction of the micropore tube, axial lengths of which decrease in sequence, the left micropore ring clip of the micropore tube and a left limit slot of the left limit disc, as well as the right micropore ring clip thereof and a right limit slot of the right limit disc are in precise fit, thereby realizing two-way limit and axial fixation of the micropore tube; the second-stage degasser comprises an axial flow degassing tube, the uniform mixing tube adopts a left-end reduced thin-walled cylindrical tube uniform mixing tube, the uniform mixing tube and the mixed flow buffer tube are connected to the first-stage liquid discharge tube and the axial flow degassing tube as one piece by means of flange connection, an inner wall of the uniform mixing tube is formed by a combination of a left uniform mixing cylindrical surface, and an uniform mixing conical surface and a right uniform mixing cylindrical surface, wherein an uniform mixing ring cavity is formed between the uniform mixing conical surface and the right uniform mixing cylindrical surface of the uniform mixing tube and the outer ring surface of the micropore tube; a hole wall of the round hole in the left limit disc is milled with a left limit slot, and each of uniform mixed flow slotted holes is uniformly arranged along a peripheral direction of a slot edge of the right limit slot;

a second-stage degasser; wherein: the second-stage degasser removes most of the gas phase carried by the gas-liquid uniform mixed flow, forms a secondary gas and a secondary fluid, and comprises an axial flow degassing tube, an axial flow vane wheel, a vane rectifier, a second-stage gas collecting tube and a second-stage liquid discharge tube; the axial flow degassing tube is connected to the second-stage liquid discharge tube to be one piece by means of flange connection, the axial flow vane wheel is formed of an axial flow rod and swirling generating vanes formed thereon, and two side ends of the axial flow rod respectively adopt a semi-ellipse spherical surface and a conical surface, the swirling generating vanes realize axial fixation of the axial flow vane wheel inside of the axial flow degassing tube cavity according to the interference fit, a contour line of the swirling generating vane is a spiral line having a gradually decreasing pitch from left to right, spiral axial flow vane grooves are formed between adjacent swirling generating vanes, and the gas-liquid uniform mixed flow inside of horizontal rapid axial flow field constantly speeds up, and is reversed and adjusted into a plurality of horizontal rapid gas-containing axial flows; the vane rectifier is formed of axial flow vanes which are evenly welded along an outer ring surface of the second-stage gas collecting tube, and the axial flow vanes realize the axial fixation of the vane rectifier and the second-stage gas collecting tube in the axial flow degassing tube cavity according to the interference fit, the second-stage gas collecting tube is formed by a combination of a gas colleting thin conical tube, a gas collecting thick conical tube and a gas collecting bent tube, and the gas collecting thick conical tube adopts a tube shell having an inner tube wall with a cylindrical surface and an outer tube wall with a conical surface; the second-stage liquid discharge tube adopts a right-end reduced T-shaped thick-walled tube, and is composed of a left liquid inlet tube segment, a right reduced liquid discharge tube segment and an upper liquid discharge straight tube segment, wherein the upper liquid discharge straight tube segment is provided with a disc connecting sleeve inside of a tube cavity thereof; and a third-stage degasser; wherein: the third-stage degasser removes a small amount of remaining liquid phase carried by the secondary gas, forms a tertiary gas and a tertiary fluid, and comprises a wet gas reversing tube, a liquid collecting tube, a third-stage exhaust tube, a third-stage liquid discharge tube and a disc connecting sleeve; the wet gas reversing tube adopts a three-way T-shaped thin-walled tube and is formed by welding a wet gas transportation tube segment and a reversing tube segment, the wet gas transportation tube segment and the liquid collecting tube form a double-tube buffer ring cavity and form a vertical reversing scrubbing field, and both sides of an inner wall of the reversing tube segment are milled with reversing conical cavity; the liquid collecting tube and a disc connecting sleeve are connected to the third-stage exhaust tube and the second-stage liquid discharge tube as one piece by means of flange connection and socket flanges, and a lower part of a tube wall of the liquid collecting tube is drilled with a round hole and is welded together with the third-stage liquid discharge tube, and the third-stage exhaust tube adopts two-end flanged reduced short tube; the disc connecting sleeve is provided with a socket flange and a connecting sleeve in sequence from top to bottom, and the connecting sleeve realizes connection of the disc connecting sleeve and the wet gas reversing tube according to interference fit, and connects the disc connecting sleeve and the second-stage gas collecting tube to be one piece by means of thread connection.

2. The compact L-shaped cylinder-cone combined tubular three-stage axial flow degassing device according to claim 1, wherein: the three-stage axial flow degassing device adopts an efficient degassing technology including a vertical high speed swirling field, a horizontal rapid axial flow field and a vertical reversing scrubbing field formed by a combination of vertical tubes, horizontal tubes and T-shaped tubes, the cylindrical tube swirling generator and the first-stage degasser are coaxially and vertically placed, the microporous uniform mixer and the second-stage degasser are coaxially and horizontally placed, and the cylindrical tube swirling generator and the first-stage degasser maintain to be parallel to the third-stage degasser, and perpendicularly intersect with the microporous uniform mixer and the second-stage degasser at the same time.

3. The compact L-shaped cylinder-cone combined tubular three-stage axial flow degassing device according to claim 1, wherein: two ends of the swirling generating tube of the cylindrical tube swirling generator are respectively provided with double flanges and a single flange, and a central part of a topmost flange is drilled with a socket hole; a tooth trace of the reduced swirling generating teeth is a spiral line, which is placed right-handed and has an increasing pitch of the spiral line from top to bottom, a section of the reduced swirling generating teeth takes a shape of an isosceles triangle; the gas-containing fluid inside of the vertical high speed swirling field continuously rotates and speeds up, and is adjusted to be a vertical high speed gas-containing swirling; a tube wall of the swirling generating tube located at an upper entrance of the reduced spiral tooth slot is drilled with a swirling generating liquid inlet hole, wherein the swirling generating liquid inlet hole is obliquely placed, and an angle between its central line and the horizontal plane is equal to a lead angle of the spiral line on which the upper tooth trace of the reduced swirling generating teeth is located; one end of the spiral liquid inlet tube is provided with a flange and the other end is provided with a wedge-shaped groove, and a part where the wedge-shaped groove of the spiral liquid inlet tube intersects with an inner wall of the swirling generating tube maintains tangent with slot bottom surface of the reduced spiral tooth slot; the first-stage exhaust tube adopts a long and thin bent tube, wherein one end of the first-stage exhaust tube and a first-stage gas collecting tube are coaxially arranged; the tube connecting sleeve adopts a thick-walled tube, wherein the tube connecting sleeve and the swirling generating tube are coaxially arranged.

4. The compact L-shaped cylinder-cone combined tubular three-stage axial flow degassing device according to claim 1, wherein: the first-stage degasser performs the first-stage segmental vertical high speed swirling degassing operation, inner walls of the lower cylindrical degassing tube segment and the upper cylindrical degassing tube segment of the cylinder-cone degassing tube adopt a cylindrical surface, while an inner wall of the conical degassing tube segment adopts an inverted conical surface; and the first-stage gas collecting tube converges and transports the primary gas; the gas collecting hood is located in the tube cavity of the upper cylindrical degassing tube segment, and an inner surface and an outer surface of the shell of the gas collecting hood adopt conical surfaces of the same conicity; the gas collecting cylindrical tube segment adopts a long and thin straight tube, and a tube diameter and a wall thickness of the gas collecting cylindrical tube segment are both equal to those of the first-stage exhaust tube; the first-stage liquid discharge tube is located at the very bottom of the first-stage degasser, and converges and discharges the primary fluid, wherein a tube diameter of the upper liquid inlet tube segment and a tube diameter of the lower settling tube segment are both equal to that of the lower cylindrical degassing tube segment and are greater than that of the right liquid discharge straight tube segment, and the right liquid discharge straight tube segment is placed horizontally.

5. The compact L-shaped cylinder-cone combined tubular three-stage axial flow degassing device according to claim 1, wherein: the swirling stopping cone of the swirling stopping rectifier is located at a lower part in a tube cavity of the lower cylindrical degassing tube segment; an inner surface and an outer surface of the shell of the swirling stopping cone adopt conical surfaces of the same conicity, and the rectifying rod adopts a round rod and is provided with a cone at a bottom; the rectifying vanes adopt a plate structure and are located in the tube cavity of the upper liquid inlet tube segment, a top end surface and a bottom end surface of each rectifying vane, as well as a top end surface of its guide groove all form a conical surface along the circumferential direction; a conicity of the conical surface on which the shell of the swirling stopping cone is located is equal to that of the conical surface on which the top end surface, the bottom end surface, as well as the top end surface of the guide groove of each rectifying vane is located, and is larger than that of a conical surface on which a shell of a gas collecting hood is located; the rectifying vanes are all located on the same cylindrical surface along a radially outer side surface of the rectifying rod, and the cylindrical surface on which the outer side surface of each rectifying vane and an inner wall of the upper liquid inlet tube segment are in interference fit.

6. The compact L-shaped cylinder-cone combined tubular three-stage axial flow degassing device according to claim 1, wherein: two side ends of the micropore tube of the microporous uniform mixer are provided with a left micropore ring clip and a right micropore ring clip, and the tube wall thereof is provided with reduced micropores; all the reduced micropore layers are in a staggered arrangement, and reduced micropores on each layer are evenly distributed along the peripheral direction; a conicity of a conical surface on which a pore wall of the large conical micropore of the reduced micropores is located is smaller than that of a conical surface on which a pore wall of the small conical micropore is located; the primary fluid carrying large bubbles is compressed by a pore channel of the large conical micropore, and is cut by a pore channel of the cylindrical micropore so as to form a gas-liquid uniform mixed flow containing small bubbles, then the gas-liquid uniform mixed flow containing small bubbles flows through a pore channel of the small conical micropore, and is slowed down and shot into an uniform mixing ring cavity between the micropore tube and the uniform mixing tube.

7. The compact L-shaped cylinder-cone combined tubular three-stage axial flow degassing device according to claim 1, wherein: the uniform mixing tube is provided with a micropore tube inside, and the left uniform mixing cylindrical surface of the uniform mixing tube and the outer ring surface of the micropore tube are in clearance fit; the mixed flow buffer tube adopts a thick-walled cylindrical short tube, both ends of which are connected, and realizes buffering of the gas-liquid uniform mixed flow; and both the left limit disc and the right limit disc adopt a round flange structure, wherein a central part of the left limit disc is drilled with a round hole, and a central part of the right limit disc is milled with a right limit slot, the left limit slot and the right limit slot both have a section of right-angled trapezoid, each of the uniform mixed flow slotted holes can realize the communication between the uniform mixing tube and the mixed flow buffer tube; an outer side slot wall of the uniform mixed flow slotted hole along the radial direction of the right limit disc adopts a semicircular conical surface while the inner side slot wall thereof adopts an arching surface, and slot walls on both sides of the uniform mixed flow slotted hole along the circumferential direction of the right limit disc adopt a semicircular cylindrical surface, as a result, the hole wall of the uniform mixed flow slotted hole takes a streamline shape.

8. The compact L-shaped cylinder-cone combined tubular three-stage axial flow degassing device according to claim 1, wherein: the second-stage degasser performs the second-stage horizontal vane wheel swirling generating rapid axial flow degassing operation according to the axial flow vane wheel, the axial flow degassing tube adopts a two-end connected thick-walled cylindrical long tube, the axial flow vane wheel is located at a leftmost end of the axial flow degassing tube; an inner side surface of each swirling generating vane is fixed to an outer ring surface of the axial flow rod by means of circumferential welding, while outer side surfaces of all swirling generating vanes are located on the same cylindrical surface which is in interference fit with an inner wall of the axial flow degassing tube; a contour line of the swirling generating vane is a spiral line extending along the outer ring surface of the axial flow rod; a tangent line at the leftmost end point of the contour line of each swirling generating vane remains parallel to an axis of the axial flow rod, and the swirling generating vanes, in cooperation with the semi-ellipse spherical surface of the axial flow rod, can successively guide the gas-liquid uniform mixed flow to each swirling generating vane; a tangent line at the rightmost end point of the contour line of each swirling generating vane intersects with the axis of the axial flow rod at an acute angle, and the swirling generating vanes, in cooperation with the conical surface of the axial flow rod, can smoothly guide out a plurality of horizontal rapid gas-containing axial flows; a section area of the swirling generating vane gradually increases along the contour line thereof, and spiral axial flow vane grooves serve as flow channels of the gas-liquid uniform mixed flow and form a horizontal rapid axial flow field.

9. The compact L-shaped cylinder-cone combined tubular three-stage axial flow degassing device according to claim 1, wherein: each axial flow vane of the vane rectifier adopts a trapezoid plate structure and is located at the rightmost end of the axial flow degassing tube cavity, all axial flow vanes are located on the same cylindrical surface along a radially outer side surface of the second-stage gas collecting tube, and the cylindrical surface on which the outer side surface of each axial flow vane is located and an inner wall of the axial flow degassing tube are in interference fit; and the second-stage gas collecting tube converges and discharges the secondary gas; the gas collecting bent tube adopts a long and thin bent tube, and a horizontal segment thereof and the axial flow degassing tube are coaxially arranged and the vertical segment thereof and a liquid collecting tube are coaxially arranged; the gas collecting thin conical tube adopts a tube shell, an inner tube wall and an outer tube wall of which are both conical surfaces, and controls a liquid-containing content of gas inside of the second-stage gas collecting tube; the gas collecting thick conical tube can successively guide the secondary fluid into the vane rectifier; the second-stage liquid discharge tube is provided with flanges at all ends of its T-shaped tube segment, and is located at the rightmost side of the second-stage degasser; the second-stage liquid discharge tube converges and discharges the secondary fluid; an inner tube wall and an outer tube wall of the right reduced liquid discharge tube segment both adopt a conical surface, and the upper liquid discharge straight tube segment is vertically placed.

10. The compact L-shaped cylinder-cone combined tubular three-stage axial flow degassing device according to claim 1, wherein: the third-stage degasser performs the third-stage vertical reversing deep degassing operation according to the wet gas reversing tube, the wet gas transportation tube segment of the wet gas reversing tube is vertically placed, and is in coaxial and layered arrangement with the liquid collecting tube from the inside out; a double-tube buffer ring cavity realizes buffering and pressure stabilization of the tertiary fluid, the reversing tube segment vertically intersects with the liquid collecting tube, the secondary gas transported by the wet gas transportation tube segment is reversed and slowed down by the reversing conical cavity of the reversing tube segment, and then is shot into the double-tube buffer ring cavity and realizes deep degassing; a sum of a flow pressure of the tertiary gas in the third-stage exhaust tube and a liquid column differential pressure of the liquid collecting tube maintains dynamic equilibrium with a pressure of the tertiary fluid inside of the third-stage liquid discharge tube; and the liquid collecting tube adopts a two-end communication thin-walled cylindrical tube, and the third-stage liquid discharge tube adopts a long and thin straight tube; an inner wall of the third-stage exhaust tube adopts a conical surface, and discharges the tertiary gas; the disc connecting sleeve adopts a disc tube socket flange, wherein the socket flange realizes axial positioning of the disc connecting sleeve, an outer ring surface of the connecting sleeve and the tube wall of the liquid discharge straight tube segment on the second-stage liquid discharge tube are in clearance fit, and an upper part of the inner wall of the connecting sleeve and a lower part of an outer ring surface of the wet gas transportation tube segment are in interference fit.

\* \* \* \* \*